United States Patent [19]

Wheeler et al.

[11] 4,103,542

[45] Aug. 1, 1978

[54] METROLOGY INSTRUMENT FOR MEASURING VERTICAL PROFILES OF INTEGRATED CIRCUITS

[75] Inventors: William R. Wheeler, Saratoga; George J. Kren, Los Altos; Karel Urbanek, Atherton, all of Calif.

[73] Assignee: Tencor Instruments, Mountain View, Calif.

[21] Appl. No.: 831,870

[22] Filed: Sep. 9, 1977

[51] Int. Cl.² .............................................. G01B 5/28
[52] U.S. Cl. ...................................................... 73/105
[58] Field of Search ........................ 33/143 L, 174 P; 73/104, 105

[56] References Cited

U.S. PATENT DOCUMENTS

| | | | |
|---|---|---|---|
| 3,501,949 | 3/1970 | Reason et al. | 73/105 |
| 3,720,818 | 3/1973 | Spragg et al. | 73/105 X |
| 3,903,735 | 9/1975 | Wilson | 73/105 |

Primary Examiner—Jerry W. Myracle
Attorney, Agent, or Firm—Thomas Schneck, Jr.

[57] ABSTRACT

A surface profile measuring instrument, which has a stylus supported on a counterbalanced scanner arm, in turn supported in a gimbal mounting having two axes, one of which is adjustable by a servo. A connected electronics package provides axis compensation for levelling through the servo, as well as zero adjustment of a display device and discrimination against small, unwanted slops. Stylus motion is translated into an analog signal by a linear position differential transformer. To achieve slope discrimination, the analog signal is differentiated and compared in a comparator to a reference for rejection of signals corresponding to small slopes. The signal is then integrated and displayed, with reference to a selected zero of a display device.

24 Claims, 8 Drawing Figures

METROLOGY INSTRUMENT FOR MEASURING VERTICAL PROFILES OF INTEGRATED CIRCUITS

BACKGROUND OF THE INVENTION a. Field of the Invention

The invention relates to metrology instruments for measuring surface profiles of flat articles and more particularly, to a recording surface profile measuring instrument for scanning flat articles having steps of various heights, such as in planar integrated circuits.

b. Prior Art

In the manufacture of semiconductor integrated circuits, it is common to deposit circuit structures on planar substrates, such that the circuit, when magnified, appears as a series of mesas of various heights rising above a plain. The performance of semiconductor integrated circuits relies, to an extent, on the dimensions of the substrate and the materials deposited thereon. It is customary to measure these dimensions in the circuit manufacturing process and to adjust variables to achieve desired integrated circuit dimensions. Of special interest are the vertical dimensions of these structures which cannot readily be measured by optical or scanning electron microscopes.

In many instances, the vertical dimensions in semiconductor integrated circuits are only a few hundred to few thousand angstroms. This requires a magnification of one thousand to one million times for measurement, while horizontal magnifications of only fifty to a few hundred times are required.

Surface profile measuring instrument measure such vertical dimensions by sensing them with a stylus which generates an electrical signal corresponding to the vertical profile taken along a line. A stylus of a prior art recording surface profile measuring instrument is typically attached to a shank and this shank is connected to the moving slug of a linear position differential transformer. The stylus, the shank and the slug must be suspended to allow motion of the stylus perpendicular to the scanned surface as it scans said surface.

Instruments of the prior art use springs to suspend the mass of the stylus and slug. A problem with this type of suspension is that vibrations transmitted to the instrument from a base, e.g. a table on which the surface profile measuring instrument is standing cause the spring-suspended stylus assembly to swing and oscillate. These swings and oscillations are then reflected in the output signal as noise. Prior art instruments need be placed on blocks of granite or on shock-insulation tables.

A problem of the prior art related to the disparity between the vertical and the horizontal magnifications, is that as a stylus scans the surface to be measured, any incline in this surface is grossly exaggerated on the output display of the surface profile measuring instrument. Thus, to display a measured step in such a manner as to obtain a horizontal recording of its bottom and its top, the table holding the substrate must be accurately mechanically levelled, i.e., made parallel to the stylus scan, before a measuring scan is performed. To obtain an output record with the line representing the flat plane of a planar substrate having a slope less than 5%, the substrate table has to be levelled better than the ratio of vertical-to-horizontal magnification, typically less than 0.0005% slope. Such levelling done manually is extremely time consuming. To manually level better than the example cited is not practically possible.

Another problem related to scale is that of the measurement falling off scale. If, say, an 800 Angstrom mesa or step is to be measured on a 1,000 Angstrom scale, the substrate carrying such a step has to be mechanically so positioned with respect to the measuring device, that the bottom of the step falls to within the first 200 Angstroms of the scale. If this requirement is not satisfied, a part of the step will fall outside the scale of the instrument, thus making measurement impossible. To position an object mechanically with such accuracy is very difficult.

An object of the invention has been to devise a suspension of all moving parts of a surface profile measuring instrument as to reduce and even eliminate effects of shocks transmitted from outside of the instrument, thus eliminating the need for special tables and also increasing the signal-to-noise ratio.

Another object of the present invention has been to devise a surface profile measuring instrument which would perform levelling automatically through the use of servo-controlled mechanisms. A further object has been to devise circuits which would accept the electrical signals from a scanner and process the signals in such a way as to permit a distinction between signals caused by sharp features of scanned surface profiles and signals caused by warpage of scanned surface, and which would suppress the latter.

Still a further object of the present invention has been to devise a surface profile measuring instrument which does not require precise positioning of specimens to be measured, with respect to the instrument, yet with the measurement to be made falling within the scale of a recording device.

SUMMARY OF THE INVENTION

The above objects have been satisfied in an instrument for measuring profiles of vertical steps of various heights found in planar integrated circuits and similar articles. The surface profile measuring instrument of the present invention features a novel mounting which achieves a significant reduction in shock and mechanical vibration to a stylus of the instrument, automatic levelling for the stylus with respect to a specimen surface by mechanical and electrical means, signal processing for rejection of small slopes not eliminated by levelling and an automatic zeroing of a readout device so that precise positioning of specimens is not required.

To achieve the significant reduction in shock and mechanical vibration a stylus which mechanically tracks step heights is mounted on a counterbalanced stylus arm which, in turn, is mounted at an end of a counterbalanced scanner arm driven for scanning by a motor. Further isolation from vibration is provided by supporting the counterbalanced scanner arm in a modified gimbal mounting with vertical and horizontal rotational axes with only a first pair of flexural pivots connecting the scanner arm to the gimbal mount on the vertical axis. The gimbal mount is connected to the instrument base by a second pair of flexural pivots aligned along the gimbal horizontal axis.

To achieve automatic levelling, the tilt of the vertical axis of the gimbal mounting about the horizontal axis is adapted for adjustment by a motor in a servo loop for compensation against tilt, while the stylus tip, at its starting position, is aligned with the horizontal axis of the mounting so that servo corrections to the mounting do not cause errors arising from off-axis positioning of the stylus.

To achieve processing of an electrical output signal to a display device to distinguish between sharp features of scanned surface profiles and small tilts, due to warpage for example, a differentiation and integration circuit has been provided which eliminates the d.c. signal component, while a comparator rejects small slopes which could not arise from steps on the surface of a specimen.

To achieve automatic zeroing of a display device for the display or recording output of the surface profile measuring instrument of the present invention, the integration circuit is provided with a reset switch which brings an output signal to a desired zero, such as the edge of a piece of recording paper.

BRIEF DESCRIPTION OF THE DRAWINGS

FIG. 7 is a side elevation of the apparatus of FIG. 1.

DESCRIPTION OF THE PREFERRED EMBODIMENT

Figure 1:
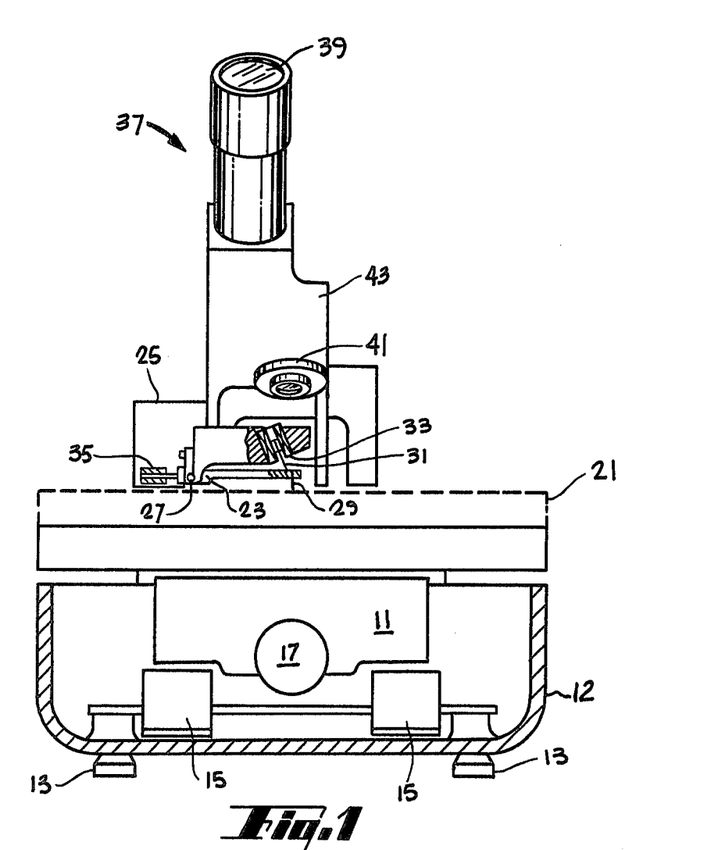
FIG. 1 is an end view of a stylus surface profile measuring instrument of the present invention.

With reference to FIG. 1, the stylus surface profile measuring instrument of the present invention is seen to include a base 11 which is supported by the foam shock mounts 15 in case 12 which is supported from a support surface by feet 13. Base 11 supports a specimen table 21 which may be raised and lowered by means of a knob 17 mounted in the base.

Immediately above the specimen table is mounted the scanner assembly which supports the stylus. The stylus arm 23 may be seen to be mounted to scanner assembly 25 at a balance point 27. On one side of the stylus arm is a stylus 29 facing specimen table 21 while a slug 31 extends upwardly above the stylus into a coil 33. Both slug 31 and coil 33 are members of a linear position differential transformer (LPDT), which has a linearity range much larger than the instrument's range of measurement. The function of the LPDT is to generate an electrical analog signal corresponding to linear motion of slug 31 within coil 33.

At the opposite end of stylus arm 23, an adjustable counter-weight 35 is provided for equalizing the rotational moments about balance point 27 wherein a flexural pivot is mounted, which maintains a slight amount of downward force on a specimen to be measured.

Above the stylus arm 23 may be seen the microscope 37, including the eye piece 39 and the objective lens 41. A microscope housing 43 mounts the eye piece 39 and the objective lens 41 so that it may be removed from the surface profile measuring instrument for easy access to the surface profile measuring instrument components.

Figure 2:
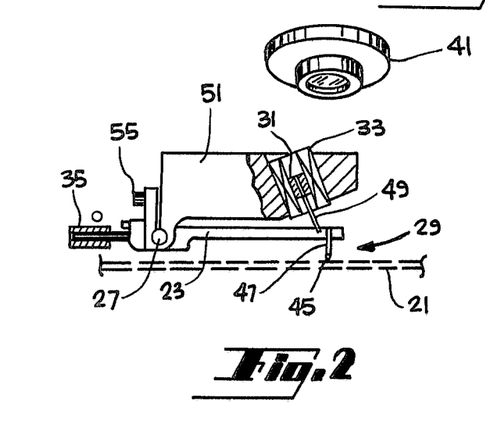
FIG. 2 is an enlarged view of a detail in the apparatus shown in FIG. 1.

In FIG. 2, a detail of the mounting of the stylus arm 23 is shown. A scanner arm 51 is shown for mounting the balance point 27 which is a low friction bearing. The stylus arm 23 is supported above specimen table 21 with stylus 29 resting on a specimen to be measured, not shown in the drawing. Stylus 29 comprises a sharpened stylus tip 45 which actually makes contact with the specimen. It is typical that the stylus tip be diamond, although other hard substances may be used. The amount of force which the stylus point exerts on the specimen is approximately 10 milligrams, which is set by adjustment of the flexural pivot position. The stylus tip 45 is supported by the stylus tip holder 47, which is a Kovar rod extending into the stylus arm 23 at one end and connected to the stylus tip 45 at the opposite end. Use of Kovar prevents motion of the stylus due to rapid temperature changes which occur when the specimen table is illuminated by an intense source, sometimes necessary for viewing through the objective lens 41.

Above the stylus 29 is mounted a slug 31 which is disposed at the end of a quartz rod 49. Quartz is used to promote thermal stability and to prevent the slug 31 from moving when rapid temperature changes occur. The purpose of slug 31 is to form a portion of a linear position differential transformer, LPDT, which transduces motion from stylus tip 41 to a display or recorder by an electrical signal. When upward motion of the stylus tip occurs, a corresponding translation of slug 31 occurs within coil 33, causing the LPDT to generate a change in the electrical signal, said change being indicative of vertical motion of the stylus tip 45 over the surface of a sample. Coil 33 is provided with a slight forward tilt so that rotation of the stylus 29 about the balance point 29 will produce essentially linear motion of the slug 31 within coil 33. A pressure screw 55 tends to close a balance point slot 57 wherein balance point 27 is mounted. Screw 55 is maintained to provide free rotation of the stylus arm while providing for ready replacement thereof.

Figure 3:
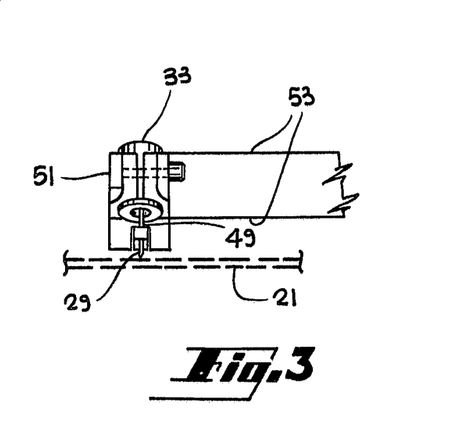
FIG. 3 is a right side cutaway view of the stylus arm illustrated in FIG. 2.

The mounting of coil 33, slug 31 and stylus 29 may be seen in FIG. 3. With respect to FIG. 3, stylus 29 is seen to contact a specimen on specimen table 21. Vertical translations of the stylus 29 are transmitted by quartz rod 49 into coil 33 wherein slug 31 resides. Wires 53 carry the electrical signal from coil 33 to a display or recorder, not shown.

Figures 4, 5:
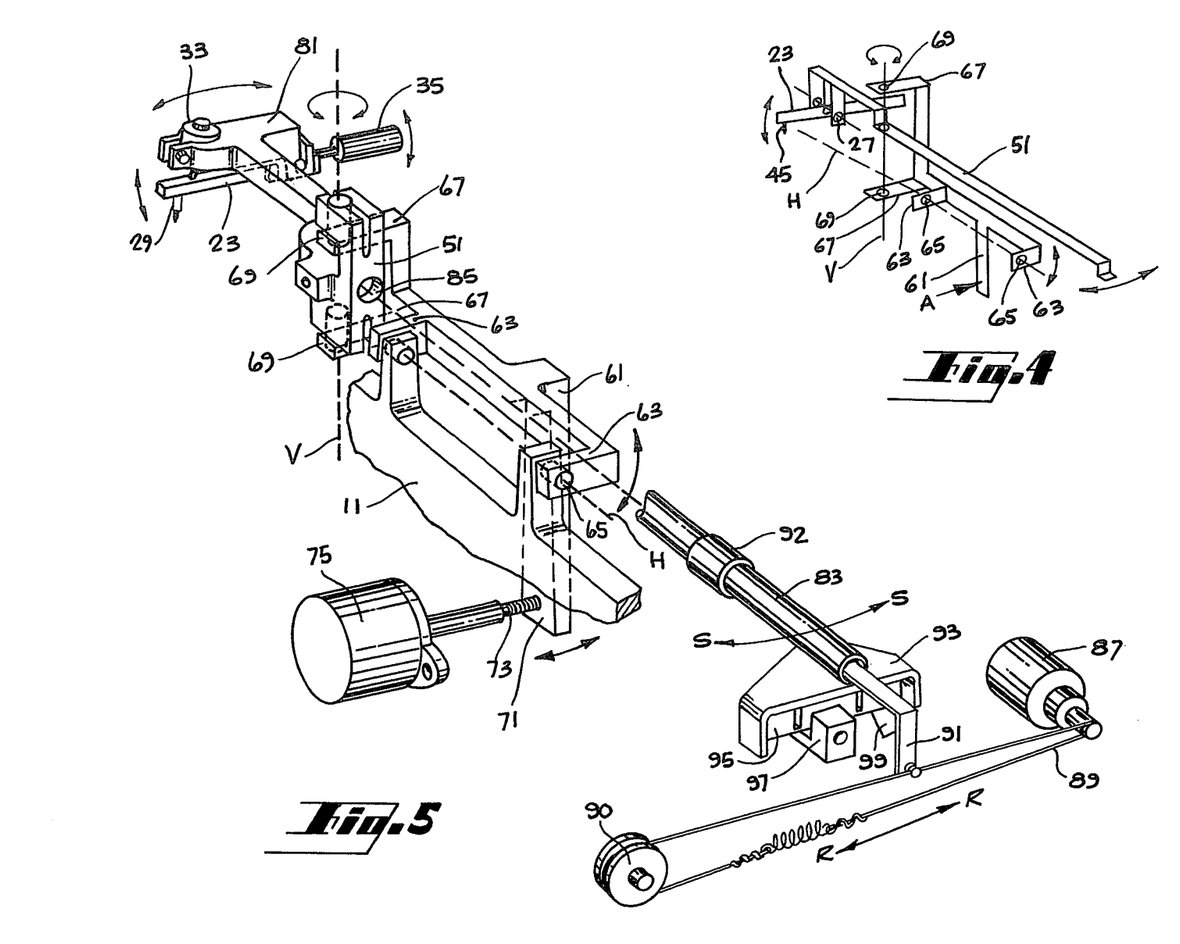
FIG. 4 is a plan view of the scanner assembly of the apparatus of FIG. 1.
FIG. 5 is a perspective, partially cutaway view of the scanner assembly whose plan is illustrated in FIG. 4.
Figure 4:
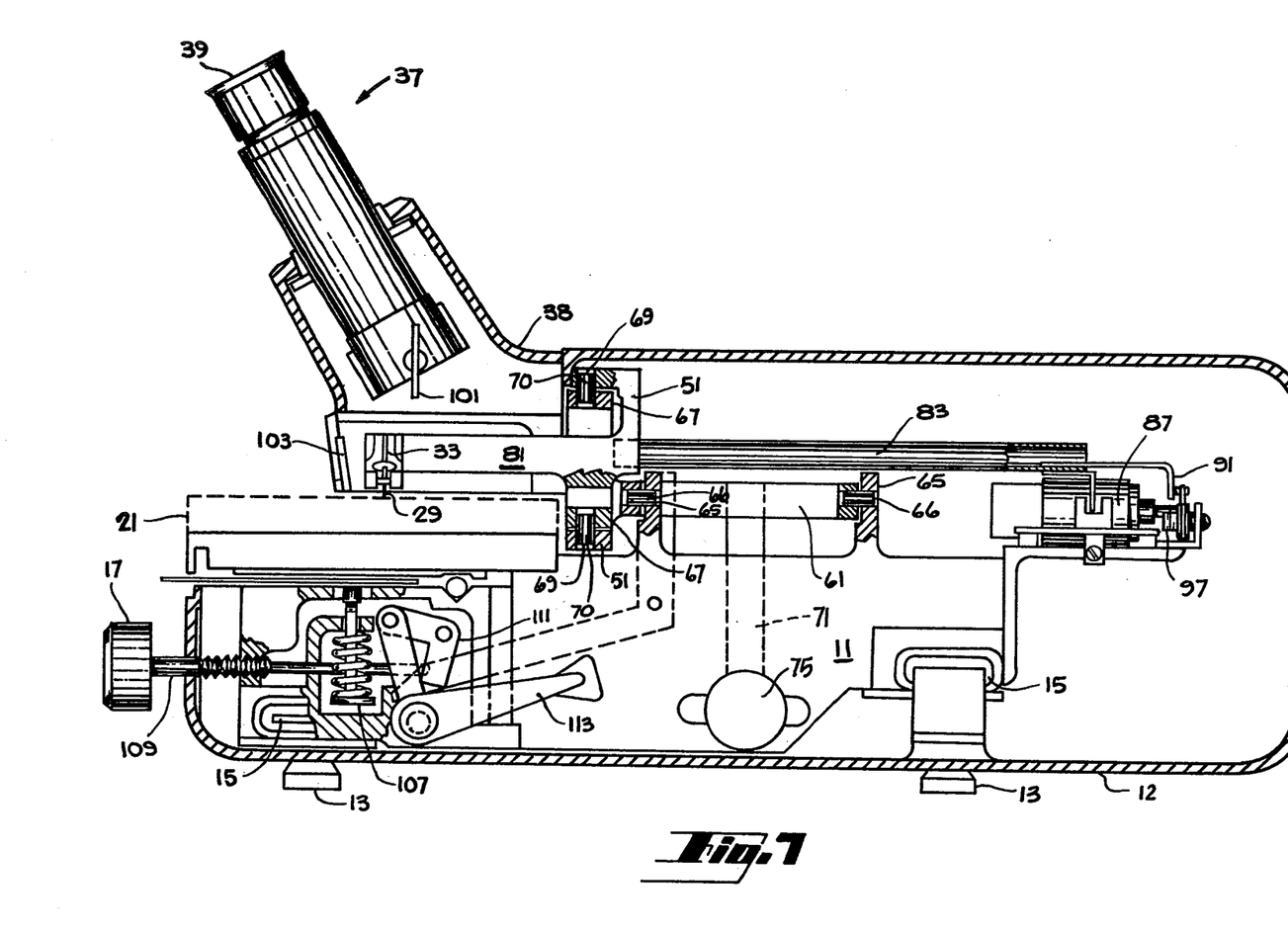

In the plan view of FIG. 4, the mounting of the stylus arm 23 in scanner arm is shown. A gimbal mount member 61 has horizontal arms 63 which define horizontal pivot holes 65. The horizontal holes 65 accommodate flexural pivots mounting member 61 to a support base 11 through the horizontal pivot holes 65.

The gimbal mount member 61 also has vertical arms 67 which define vertical pivot holes 69 therethrough in a manner such that a line through the vertical holes 69 is perpendicular to a line through the horizontal pivot holes 65 and said lines intersect each other. Flexural pivots are provided in the vertical pivot holes 69 so that the scanner arm 51 may rotate, with some restoring force, about a line defined through the vertical pivot holes 69. The scanner arm 51 is axially mounted directly above pivot holes 65 and aligned therewith. The vertical pivots are forward, toward stylus tip 45, of the horizontal pivots, forming an offset gimbal mounting.

It will be seen that the gimbal mount member 61 is mounted for rotation about the horizontal axis H. It will be noted that the horizontal axis H passes through the stylus tip 45 when the stylus is at its starting position. On the other hand, the scanner arm 51 is mounted relative to gimbal mount member 61 for rotation about the vertical axis V, defined through the vertical pivot holes 69 of the vertical arms 67. The gimbal mount member 61 may be tilted by a force applied at the arrow A which causes rotation of the gimbal mount member 61 about axis H, compensating for undesired tilt of the vertical axis V with respect to axis H, by means of electromechanical feedback explained hereinafter. It is desired to offset undesired tilt to maintain level between the specimen surface and the stylus scanning path. When undesired tilt exists, the recorder pen will draw an inclined line when tracing the profile of the flat surface. This may be because the instrument itself is on a slight incline, or because the specimen is wedge-shaped, due to warpage perhaps. The present invention is not intended to detect whether the specimen is wedge-shaped, but whether there are step-heights on the surface of the specimen. The instrument of the present invention provides a levelling of the surface so that the recorder, by means of feedback applied at arrow A, tilts the gimbal mount member 61 and scanner arm 51 so that the specimen surface appears level at the recorder output.

Gimbal mount member 61 is seen in more detail in FIG. 5. Horizontal pivot holes 65 mount flexural pivots which connect gimbal mount member 61 to base 11. The gimbal mount member 61 has a downwardly extending leg 71 against which a force arm 73 pushes, thereby exerting a rotational moment of the leg 71 about the horizontal axis H. The force member 71 is directly or indirectly connected to base 11 and mounted therein for communicating force to the gimbal mount member 61 for compensating undesired tilt. The force arm 73 may be secured to leg 71 to precisely and positively control the rotation of leg 71. Force arm 73 may be a piston which is activated by a stepping motor 75, or alternatively, a piezoelectric, or other electro-mechanical force transducer.

Vertical arm 67 of gimbal mount member 61 defines the vertical pivot holes 69 through which a second pair of flexural pivots is mounted for disposing the scanner arm 51 for rotational motion about these pivots. Scanner arm 51 includes a forward head 81 which mounts the stylus arm 23, as well as coil 33. The scanner arm 51 has a rearward tail 83 which communicates with forward head 81 through a port 85 in which the tail is secured. The tail clears the top of gimbal mount member 61 for free horizontal scanning motion. This scanning motion exists in the direction indicated by the arrows S, with scanning motion being imparted by scanning motor 87 which drives belt 89 about pulley 90 in reciprocal motion from the scanning motor 87, moving in the manner indicated by the arrows S. The film holder 93 holds an opaque piece of film having vertical translucent slits. An edge slit is disposed in the film 95 such that when the slit passes in front of the electro-optical switch 97, scanning motion is reversed. Another electro-optical switch 99 is provided to detect a central slit in film 95 which indicates that the axis of scanner arm 51 is parallel with the horizontal axis H, thereby placing stylus tip 45 in horizontal axis H. This is the desired starting position for the instrument.

The scanner arm 51 is itself counterbalanced so that forward head 81 and rearward tail 83 do not exert undesired moments on the pivots. An adjustment sleeve 92 which cylindrically fits over rearward tail 83 and is movable along the length of the tail adjusts the balance of the forward head 81 against the rearward tail 83 such that the rotational moments of each about the vertical axis V are equal.

By counterbalancing the scanner arm 51 and by counterbalancing the stylus arm 23, the stylus tip is insulated against shock and vibration which would otherwise be transmitted through the base of the instrument to the stylus tip. The double isolation of the stylus tip permits tracking of step heights by a mechanical instrument to an accuracy of a few tens of angstroms, with elimination of random fluctuations and output signal which were previously indicative of ambient vibrations.

Figure 6:
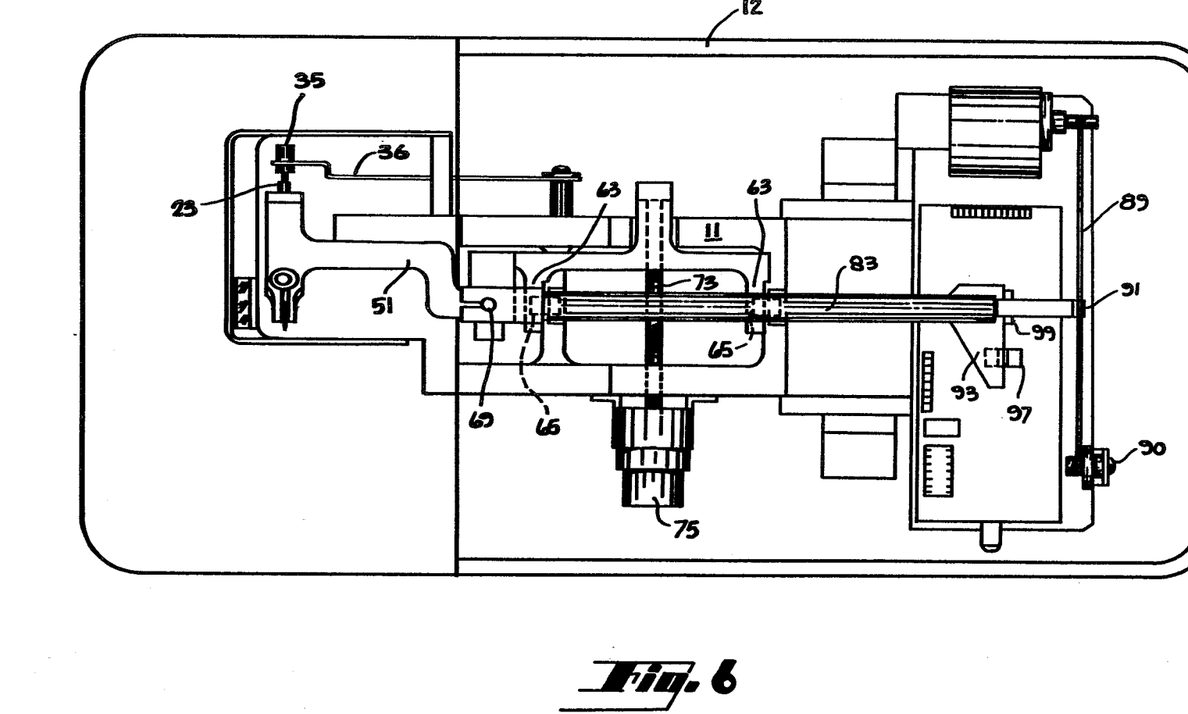
FIG. 6 is a top view of the apparatus of FIG. 1 with microscope optics removed.

In the top view of FIG. 6, the components of the apparatus of the present invention may be viewed in relation to base 11 with the microscope portion removed. Scanner arm 51 carries stylus arm 23, mounted in the forward head 81 of the scanner arm. The rearward tail 83 is seen to extend rearwardly, with stub 91 being connected to belt 89 and scanning motor 87. The rearward tail 83 is seen to extend over the horizontal arms 63 of the gimbal mount member 61. Force arm 73 extends from motor 75 to the leg of the gimbal mount member 61 under rearward tail 83.

Counterweight 35 is seen to have a lever 36 extending thereover which may be manually depressed for forcing the counter-weight down and the stylus tip up. Releasing of lever 36 permits the stylus to be lowered into contact with a specimen.

The side cutaway view of FIG. 7 shows the microscope 37 disposed over the specimen table 21, with internal mirrors 101 and 103 directing light from the specimen table and specimen, proximate to the location of stylus 29 to the eye piece 39. It will be seen that the microscope 37 is mounted in a shroud 38 which may be removed from the instrument for easy access to the stylus 29. The forward head 81 which carries stylus 29 and the rearward tail 83 form portions of the scanner arm 51 which is connected to the vertical arms 67 of gimbal mount member 61 through the vertical pivots 70 mounted in the vertical pivot holes 69. The gimbal mount member 61 is mounted to base 11 by means of the horizontal flexural pivots 66 which are mounted in the horizontal pivot holes 65. As previously mentioned, the gimbal mount member 61 is tilted by force supplied by motor 75 on the downwardly extending leg 71 of gimbal mount member 61 thereby causing rotation about the horizontal axis defined through the pivots 66.

Scanning motion of the scanner arm 51 consists of limited reciprocal rotation about the vertical axis defined through pivots 70 with reciprocating force applied to stub 91 by means of scanning motor 87. Thus, it is seen that the scanner arm 51 is gimbal mounted for rotation about two axes.

Specimen table 21 is pulled downwardly by a compression spring 105 which pushes against a bracket 107 which is mounted to base 11. Knob 17 is connected to a shaft 109 which pushes against a knuckle 111 which forces the specimen table upward when shaft 109 is moved inwardly. At the opposite end of knuckle 111 a quick release lever 113 is connected, also pushing the knuckle upwardly for rapid motion of the specimen table 21. Thus, the specimen table 21 may be moved either by motion of shaft 109 of quick release lever 113.

Figure 8:
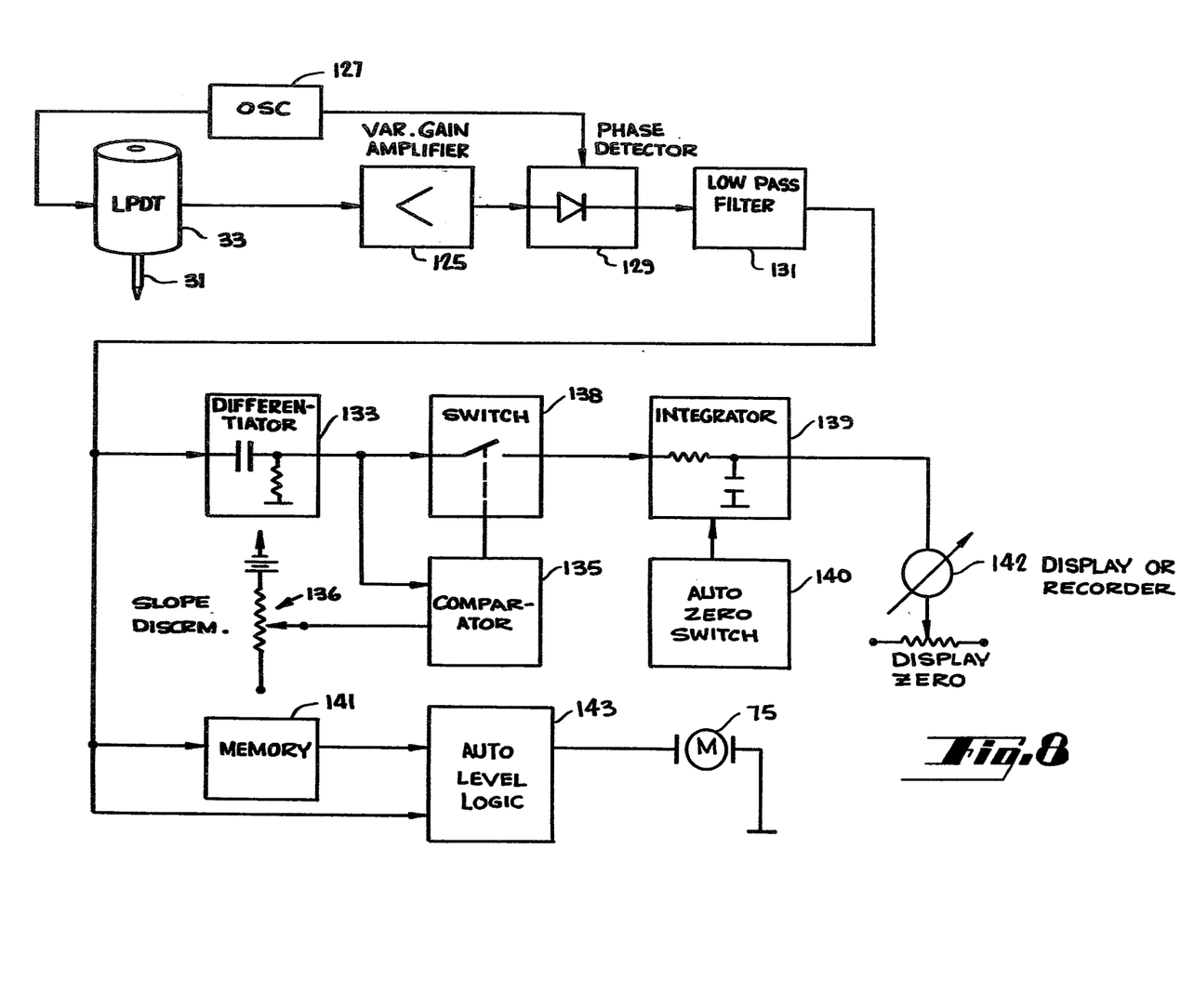
FIG. 8 is an electrical plan for the apparatus of FIG. 1.

The electrical plan of FIG. 8 illustrates automatic levelling of the stylus path over a specimen by means of adjustment of the gimbal mounting. The plan also illustrates the electrical means for distinguishing between sharp features of the scanned surface and small tilts, which are rejected. Lastly the plan illustrates automatic zeroing of the stylus.

Electrically, the slug 31 connected to the stylus arm, not shown, is free to move in the center of coil 33 which together form a linear position differential transformer having a linearity range much larger than the instrument's range of measurement. The LPDT is connected to the high frequency oscillator 127 which provides excitation of the LPDT at 6.25 kHz. While this frequency is not critical, it is suitable for sensing small variations in the position of slug 31. Both the oscillator 127 and the amplifier 125 are connected to a phase detector 129 for detecting a signal which is proportional to the position of slug 31. The output signal from phase detector 129 is fed to an active low pass filter 131 for eliminating any residual signals from the high frequency oscillator 127. The output from filter 131 is an electrical signal corresponding to step heights of a flat article with respect to an arbitrary reference. The electrical signal consists of a function of time plus constants where the constants are representative of d.c. signal components.

The filter output signal is fed to a differentiation circuit 133. This circuit is typically an operational amplifier which is arranged for taking the time derivatives of the time varying step height functions. The output of the differentiation circuit eliminates the constants which represent d.c. signal components, leaving only time varying step height functions. This output signal is compared in the comparator 135 with a reference signal from reference level generator 136 which may be potentiometer connected to a voltage source.

Comparator 135 rejects any time varying signal from differentiator 133 which represents a slope derivative which is less than a reference value as selected in the reference level generator 136. In other words, the differentiated electrical signal emerging from the differentiator 133 may contain slope derivatives which have some slight degree of tilt indicated therein arising from warpage of the sample or other causes. The differentiated signal components representing slope derivatives which are less than a reference value are rejected and comparator 135 puts out a discriminated electrical signal indicating the presence of component slope derivatives at the differentiator 133 which are greater than the reference value, i.e. indicative of true step heights.

The output of comparator 135 is transmitted to transmission gate 138 for enabling the output of differentiation circuit 133 to be transmitted to integrator 139 by closure of the transmission gate 139. Integrator 139 integrates the signal fed to it by differentiation 133, thereby reconstituting the original signal into differentiation circuit 133, but without d.c. signal components and without small tilts of the type arising from specimen warpage.

Automatic zeroing of the apparatus herein is provided by a switch 140 which discharges integrator 139 and opens at the start of a measurement. The stylus then goes to the zero point set in a display 142. The zero point may be the edge of a piece of graph paper in a recorder or the center line of a meter.

The same signal from filter 131 transmitted to differentiation circuit 133 is transmitted to a memory unit, 141, a sample and hold circuit which remembers the vertical starting position of slug 31. The same signal is also transmitted to auto level logic gate 143. If positive or negative changes occur due to vertical changes in the position of slug 31 indicative of specimen tilt, motor 75 is operated for causing compensating tilt to the stylus by force exerting in the direction of arrow A against gimbal mount member 61 in FIG. 4.

Memory unit 141 operates for a time period which correponds to a one-half millimeter scan. At the end of the first pass, scanning is interrupted, the scanning arm is re-set to its initial position and memory is loaded with the new value. During the second pass, in which the motor 75 operates at lower speed, data is collected for the decision to be made at the end of the pass. That decision is whether the apparatus is leveled or not leveled. If leveled, a full 3-millimeter scan is taken after another reset to the initial position. If not leveled, a third attempt is made at very low motor speed. If level is not reached at the end of this third pass, the instrument will automatically switch into manual mode and wait for new instructions.

What is claimed is:

1. A tilt compensated stylus scanner assembly comprising, a balanced scanner arm mounted for rotation about a vertical axis, said scanner arm having a stylus mounted proximate to a first end of said scanner arm for contact with a flat article to be scanned, said scanner arm having scanning motion means connected to said scanner arm for providing motion to said scanner arm, gimbal mount means having aligned pivots defining a horizontal axis and aligned pivots defining said vertical axis perpendicularly intersecting said horizontal axis for mounting said balanced scanner arm, said gimbal mount means itself mounted for rotation relation to a fixed base about said horizontal axis, and force means connected to said base and communicating force to said gimbal mount means for compensating undesired tilt of said vertical axis with respect to said horizontal axis.

2. The apparatus of claim 1 wherein said stylus is disposed on a counterbalanced stylus arm, said stylus arm mounted at a balance point proximate an end of said scanner arm.

3. The apparatus of claim 2 wherein said stylus has a stylus point disposed along said horizontal axis.

4. The apparatus of claim 2 wherein said stylus arm has a slug mounted thereon and said scanner arm has a coil mounted thereon surrounding said slug, said slug and coil comprising a linear position differential transformer means for generating an electrical signal indicative of stylus motion.

5. The apparatus of claim 4 further comprising a display means for displaying said electrical signal.

6. The apparatus of claim 1 wherein said pivots defining said vertical axis are cylindrical flexural pivots.

7. The apparatus of claim 1 wherein said pivots defining said horizontal axis are cylindrical flexural pivots.

8. The apparatus of claim 1 wherein said scanning motion means comprises a motor connected to said scanner arm on a second end of said arm opposite said first end and a pair of switches electrically connected to change the direction of said motor and spaced at a distance such that a portion of said scanner arm moves therebetween, said scanner arm activating one of said switches upon proximate approach thereto.

9. The apparatus of claim 1 wherein said force means comprises an electrically driven piston.

10. The apparatus of claim 1 wherein said pivots defining said vertical axis are forward of said pivots defining said horizontal axis.

11. The apparatus of claim 1 wherein said base is connected to a movable specimen table for supporting flat articles, said table disposed directly beneath said stylus and having means for providing gross and fine motion adjustment of said table relative to said stylus.

12. A step height surface profile measuring instrument comprising:
  scanner assembly means for stylus scanning of a flat article having step heights, said scanner assembly means generating a first electrical signal comprising a function of time corresponding to a step height profile of said flat article, plus constants corresponding to a d.c. bias,
  differentiation means electrically connected to said scanner assembly means to receive said first electrical signal therefrom for electrically differentiating said first electrical signal with respect to time thereby eliminating said constants and for putting out a differentiated electrical signal corresponding to a plurality of sequential component slope derivatives,
  comparator means electrically connected to said differentiation means to receive said differentiated electrical signal for rejection of those component slope derivatives which are less than a selected value, and for putting out an electrical signal comprising sequential component slope derivatives which are greater than said selected value, and
  integration means electrically connected to said comparator means to receive said electrical signal for integration with respect to time and a selected reference, of a readout device thereby providing step height profiles of said flat article referenced to a selected reference.

13. The apparatus of claim 12 further comprising,
  a display means connected to said integration means for displaying said electrical signal and
  a zero adjust means connected to said integration means for selecting a zero reference in said display means.

14. The apparatus of claim 12 wherein said scanner assembly means comprises,
  a balanced scanner arm mounted for rotation about a vertical axis, said scanner arm having a stylus mounted proximate to a first end of said scanner arm for contact with a flat article to be scanned, said scanner arm having scanning motion means connected to said scanner arm for providing motion to said scanner arms,
  gimbal mount means having aligned pivots defining a horizontal axis and aligned pivots defining said vertical axis perpendicularly intersecting said horizontal axis for mounting said balanced scanner arm, said gimbal mount means itself mounted for rotation relative to a fixed base about said horizontal axis, and
  force means connected to said base and communicating force to said gimbal mount means for compensating undesired tilt of said vertical axis with respect to said horizontal axis.

15. The apparatus of claim 14 wherein said stylus is disposed on a counterbalanced stylus arm, said stylus arm mounted at a balance point proximate an end of said scanner arm.

16. The apparatus of claim 15 wherein said stylus has a stylus point disposed along said horizontal axis.

17. The apparatus of claim 15 wherein said stylus arm has a slug mounted thereon and said scanner arm has a coil mounted thereon surrounding said slug, said slug and coil comprising a linear position differential transformer means for generating an electrical signal indicative of stylus motion.

18. The apparatus of claim 17 further comprising a display means for displaying said electrical signal.

19. The apparatus of claim 14 wherein said pivots defining said vertical axis are cylindrical flexural pivots.

20. The apparatus of claim 14 wherein said pivots defining said horizontal axis are cylindrical flexural pivots.

21. The apparatus of claim 14 wherein said scanning motion means comprises a motor connected to said scanner arm on a second end of said arm opposite said first end and a pair of switches electrically connected to change the direction of said motor and spaced at a distance such that a portion of said scanner arm moves therebetween, said scanner arm activating one of said switches upon proximate approach thereto.

22. The apparatus of claim 14 wherein said force means comprises an electrically driven piston.

23. The apparatus of claim 14 wherein said pivots defining said vertical axis are forward of said pivots defining said horizontal axis.

24. The apparatus of claim 14 wherein said base is connected to a movable specimen table for supporting flat articles, said table disposed directly beneath said stylus and having means for providing gross and fine motion adjustment of said table relative to said stylus.

* * * * *